United States Patent [19]

Hattori et al.

[11] Patent Number: 4,618,043
[45] Date of Patent: Oct. 21, 1986

[54] METHOD FOR AUTOMATIC CONTROL OF A MOTOR VEHICLE CLUTCH

[75] Inventors: Toshihiro Hattori, Ayase; Masaki Ishihara, Fujisawa; Makoto Uriuhara, Yokohama; Hitoshi Kasai; Yasuyoshi Asagi, both of Kawasaki, all of Japan

[73] Assignees: Isuzu Motors Limited, Tokyo; Fujitsu Limited, Kawasaki, both of Japan

[21] Appl. No.: 625,203

[22] Filed: Jun. 27, 1984

[30] Foreign Application Priority Data

Jun. 29, 1983 [JP] Japan .................................. 58-117227

[51] Int. Cl.⁴ ............................................. B60K 41/02
[52] U.S. Cl. ..................... 192/0.052; 192/0.075; 192/0.076; 192/0.092; 192/0.096
[58] Field of Search ............... 192/0.033, 0.052, 0.062, 192/0.076, 0.092, 0.096, 3.58, 103 R, 103 F, 0.075, 0.084

[56] References Cited

U.S. PATENT DOCUMENTS

| | | | |
|---|---|---|---|
| 4,061,217 | 12/1977 | Toyota et al. | 192/0.052 |
| 4,294,341 | 10/1981 | Swart | 192/0.076 X |
| 4,295,551 | 10/1981 | Zimmermann et al. | 192/0.076 |
| 4,331,226 | 5/1982 | Heidemeyer et al. | 192/0.076 |
| 4,401,200 | 8/1983 | Heidemeyer et al. | 192/0.076 |
| 4,434,879 | 3/1984 | Lutz et al. | 192/0.052 |
| 4,494,639 | 1/1985 | Takano et al. | 192/0.052 |

FOREIGN PATENT DOCUMENTS

| | | |
|---|---|---|
| 0038113 | 10/1981 | European Pat. Off. . |
| 0062426 | 10/1982 | European Pat. Off. . |
| 3028250 | 3/1982 | Fed. Rep. of Germany . |
| 3145630 | 10/1982 | Fed. Rep. of Germany . |

Primary Examiner—Rodney H. Bonck
Assistant Examiner—Richard M. Lorence
Attorney, Agent, or Firm—Staas & Halsey

[57] ABSTRACT

An electronic control method for vehicles, wherein, when exercising control to start a vehicle from rest, the vehicle engine and clutch are controlled in a very low speed control mode, if the amount by which an accelerator pedal is depressed is less than a set value. If, however, the amount of accelerator pedal depression is greater than the set value, the engine and clutch are controlled in an ordinary start control mode. When the vehicle is travelling and the speed thereof is less than a set value, the clutch is controlled in a start control mode. When the travelling speed of the vehicle is greater than the set value, the clutch is controlled in a shift mode.

8 Claims, 17 Drawing Figures

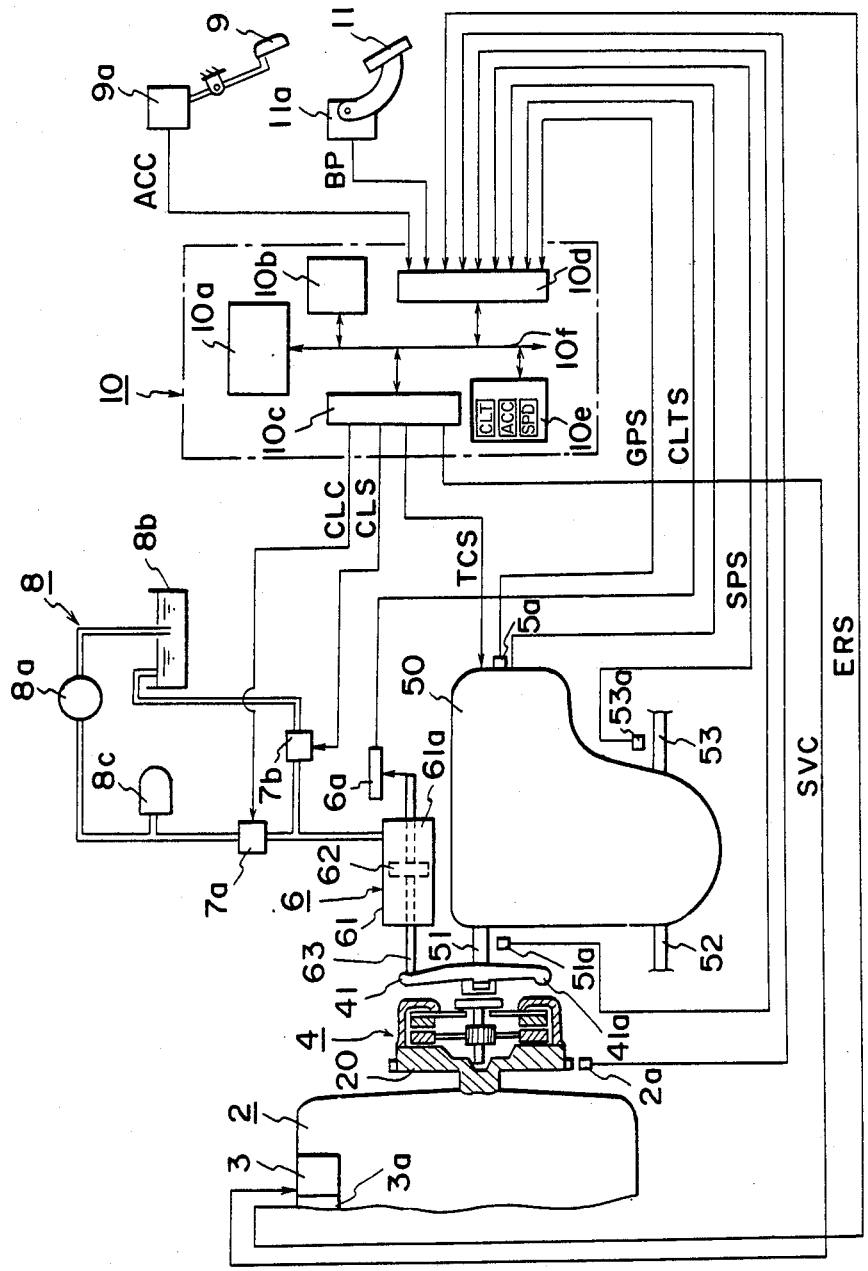

METHOD FOR AUTOMATIC CONTROL OF A MOTOR VEHICLE CLUTCH

BACKGROUND OF THE INVENTION

This invention relates to a control method for vehicles and, more particularly, to a clutch and engine control method.

An automatic clutch known in the art automatically controls a friction clutch of an automobile, e.g., a dry-type, single disk clutch, by means of an electronic control apparatus. Specifically, the known automatic clutch automates the transmission and disengagement of motive power by a friction clutch by means of an electronic control apparatus which controls an actuator that operates in response to hydraulic, pneumatic or negative pressure. A control apparatus for an automatic clutch of this type is disclosed in the specification of Japanese Patent Publication No. 50-12648, wherein the engaged state of a clutch is gradually varied depending upon an increase in engine rpm, and in the specification of Japanese Patent Application Laid-Open No. 52-5117, wherein the rate at which a clutch is engaged is varied in accordance with engine rpm.

In a vehicle equipped with such an automatic clutch, operation is no different from that of a vehicle having an automatic transmission equipped with a torque converter. To propel the vehicle, therefore, the driver depresses the accelerator pedal a considerable amount and continues to hold the pedal depressed until a certain velocity is attained. More specifically, with an automatic transmission having a torque converter, the engine is constantly subjected to a load of a certain magnitude in the drive range. No matter how far the accelerator pedal is depressed, the engine will not "race" excessively. In addition, the higher the engine rpm and the greater the slip factor, the greater the torque ratio obtained. This increases the drive torque as well as the engine braking torque, thereby suppressing racing.

In a vehicle equipped with the above-described automatic clutch, however, the clutch engaging operation is performed after the rise in engine rpm, thereby resulting in the following inconveniences. First of all, when the clutch starts to be engaged, engine rpm rises considerably, during which time the vehicle itself is completely at rest. Therefore, (1) the engine races, (2) the amount of clutch slip sustained in a half-clutch operation becomes large owing to engine racing, thereby resulting in clutch wear and reduced clutch useful life, and (3) fuel consumption rises as a result of (1) and (2). Secondly, after the driver depresses the accelerator pedal, a certain period of time is required before engine rpm rises. Since the clutch is controlled in accordance with the rise in engine rpm, starting response diminishes markedly. Furthermore, since the vehicle will not move forward under these conditions even when the accelerator pedal is depressed, the driver tends to step down on the pedal excessively. This not only aggravates the phenomena (1) through (3) but also increases the risk of sudden forward movement since the accelerator pedal will be in a considerably depressed state and the engine rpm high when the vehicle starts moving. In particular, problems are encountered when attempting to move the vehicle a slight amount at low speed, as when parking an automobile in a garage or close to a curb.

In the conventional clutch control system, a proportional constant is set so that the clutch engaging operation takes place comparatively slowly in order to realize a smooth start and minimize both sudden forward movement and shock when movement starts. As a result of setting the proportional constant, clutch control is performed slowly at gear shifting following the start of the vehicle, thereby lengthening the time for shifting and making it difficult to achieve smooth acceleration after the gear change. In addition, shock is produced when engine rpm experiences a sudden change. When a proportional constant suitable for shifting is set, on the other hand, problems in control are encountered when starting the vehicle from rest.

As regards engine fuel supply means, e.g, a throttle valve in a gasoline engine or a fuel injection pump in a diesel engine, certain problems are encountered because such means are controlled independently of the clutch. Specifically, where the accelerator pedal is depressed to accelerate the vehicle from a state in which the clutch is disengaged when the vehicle is started or travelling at low speed, the clutch is controlled comparatively slowly to avoid shock and realize smooth acceleration, as set forth above. As shown in FIG. 8, herein which is a graph showing degree of clutch engagement plotted against time, clutch engagement starts at time $t_0$ and rises to 100% (full clutch engagement) at time $t_l$. A so-called "half-clutch" state prevails between times $t_0$ and $t_l$. On the other hand, in, say, a gasoline engine, a throttle valve for controlling the amount of fuel and air supplied to the engine has its opening controlled, independently of the clutch, in accordance with the amount of accelerator pedal depression to increase the fuel and air supply and raise the engine rpm.

Until the clutch becomes fully engaged, therefore, the engine races and the driver experiences an unpleasant sensation. At the same time, the engine rpm and the vehicle speed are not linearly related (1:1) until the clutch is fully engaged. This makes it very difficult for the driver to operate the accelerator as when starting the vehicle from rest. In addition, since the clutch is caused to slip while the engine is rotating at high speed, drawbacks are encountered in terms of fuel consumption and clutch wear.

SUMMARY OF THE INVENTION

Accordingly, it is an object of the present invention to provide a control method for starting a vehicle, whereby engine racing is prevented when the vehicle is started from rest, as well as clutch wear and poor fuel economy, which traditionally accompany engine racing, during half-clutch operation.

Another object of the present invention is to provide a control method for starting a vehicle, in which sudden forward movement of the vehicle is prevented by dividing clutch control at the time the vehicle is started from rest into a very low speed control mode, and an ordinary starting mode depending upon the amount the accelerator pedal is depressed, so that the vehicle can be controlled with accuracy in cases where the vehicle is moved in small increments at very low speed, as when parking in a garage or close to a curb.

Still another object of the present invention is to provide a clutch control method whereby clutch control is divided into a start mode and a shift mode, depending upon the operating conditions of the vehicle to achieve optimum control when starting the vehicle from rest and when changing gears.

A further object of the present invention is to provide a fuel control method capable of preventing engine racing when a clutch is controlled.

According to the present invention, the foregoing objects are attained by providing a method for controlling the start of a vehicle equipped with: an accelerator pedal sensor for sensing an amount of depression of an accelerator pedal; a throttle actuator for controlling an amount of fuel supplied to an engine; an engine rotation sensor for sensing rpm of the engine; a clutch actuator for controlling an amount of engagement of a clutch; a clutch stroke sensor for sensing the amount of engagement of the clutch; and an electronic control apparatus which receives detection signals from each of the sensors for controlling the throttle actuator and the clutch actuator based on the detection signals. The method comprises the steps of: (a) sensing the amount of depression of the accelerator pedal; (b) performing a comparison to determine whether the amount of accelerator pedal depression is greater than or less than a set value; (c) selecting a start control mode depending upon the amount of accelerator pedal depression; and (d) controlling the throttle actuator and the clutch actuator in the control mode selected in the step (c).

According to another embodiment of the present invention, there is provided a method for controlling a clutch in a vehicle equipped with: an accelerator pedal sensor for sensing an amount of depression of an accelerator pedal; a clutch actuator for controlling an amount of engagement of a clutch; a clutch stroke sensor for sensing the amount of engagement of the clutch; an engine rotation sensor for sensing rpm of the engine; a vehicle speed sensor for sensing travelling speed of the vehicle; a gear position sensor for sensing a gear position of a transmission; and an electronic control apparatus which receives detection signals from each of the sensors for controlling the clutch actuator based on the detection signals. The method comprises the steps of: (a) sensing the travelling speed of the vehicle; (b) performing a comparison to determine whether the travelling speed is greater than a set value; (c) selecting a clutch control mode depending upon the travelling speed of the vehicle; and (d) controlling the clutch actuator in the control mode selected in the step (c).

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a schematic view illustrating the construction of an engine and clutch control apparatus according to another embodiment of the present invention;

DETAILED DESCRIPTION OF THE PREFERRED EMBODIMENTS

Figure 1:
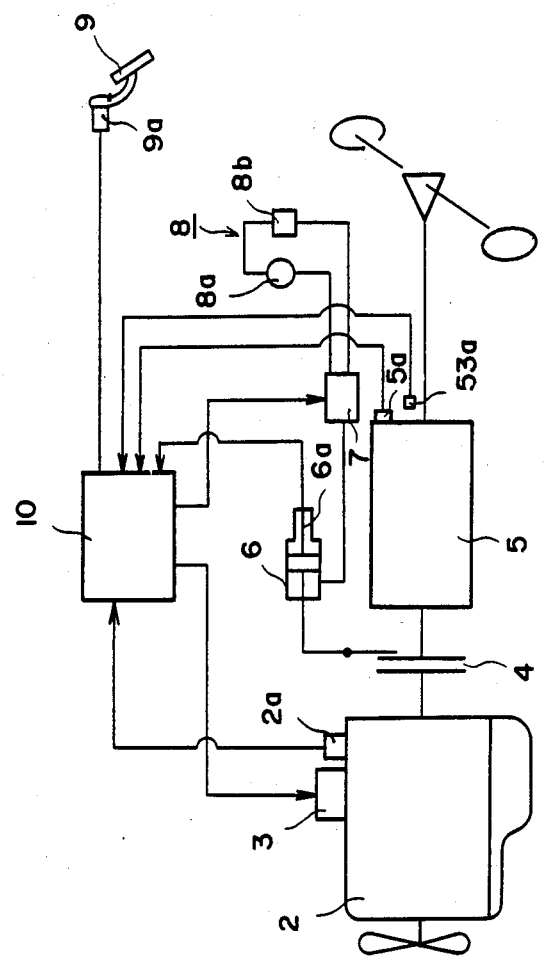
FIG. 1 is a schematic view illustrating the construction of an engine and clutch control apparatus for practicing the present invention according to an embodiment thereof.

Reference will now be had to the schematic view of FIG. 1 showing a vehicle engine, clutch and a control apparatus for controlling the engine and clutch according to an embodiment of the present invention. An engine 2 is provided with an engine rotation sensor 2a for sensing the rpm of the engine. A throttle actuator 3 comprising a step motor, or the like, controls fuel supply means of the engine 2. A clutch 4 is provided for connecting and disconnecting motive force transmitted from the engine 2 to a transmission 5. A clutch actuator 6 for actuating the clutch 4 is equipped with a clutch position sensor 6a for sensing the amount of engagement of the clutch 4. A solenoid valve 7 is arranged in a hydraulic circuit of a hydraulic mechanism 8 which operates the clutch actuator 6 and which comprises a hydraulic pump 8a and a reserve tank 8b. The solenoid valve 7 is adapted to control the hydraulic pressure acting upon the clutch actuator 6, thereby controlling also the speed at which the clutch actuator 6 operates. Numeral 9 denotes an accelerator pedal having an accelerator sensor 9a for sensing the amount of accelerator pedal operation. An electronic control apparatus 10 constituted by a microcomputer functions to control the clutch actuator 6 and throttle actuator 3 on the basis of output signals from: the engine rotation sensor 2a; the clutch position sensor 6a; the accelerator pedal sensor 9a; a gear position sensor 5a for sensing the gear position of the transmission 5; and a vehicle speed sensor 53a.

In operation, the electronic control apparatus 10 receives an input from the accelerator pedal sensor 9a indicative of the amount of depression of the accelerator pedal 9, an input from the clutch position sensor 6a indicative of the amount of clutch engagement, and an input from the engine rotation sensor 2a indicative of the rpm of engine 2. On the basis of these input signals, the electronic control apparatus 10 controls the solenoid valve 7 for operating the clutch actuator 6, thereby controlling the fuel supply means and the clutch 4.

Figure 2:
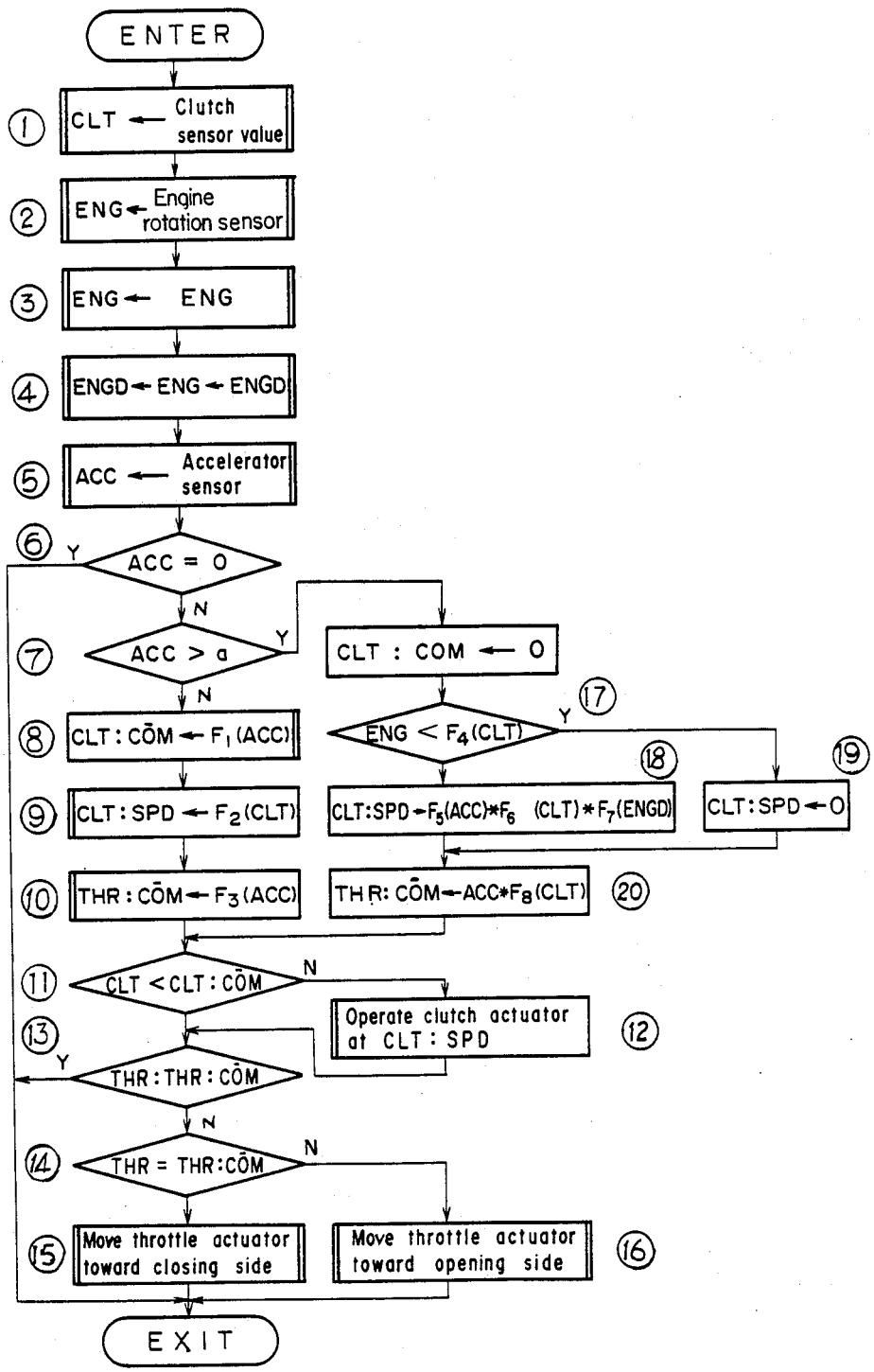
FIG. 2 is a flowchart illustrating how control is performed in accordance with a vehicle starting control method according to an embodiment of the present invention.
Figure 3:
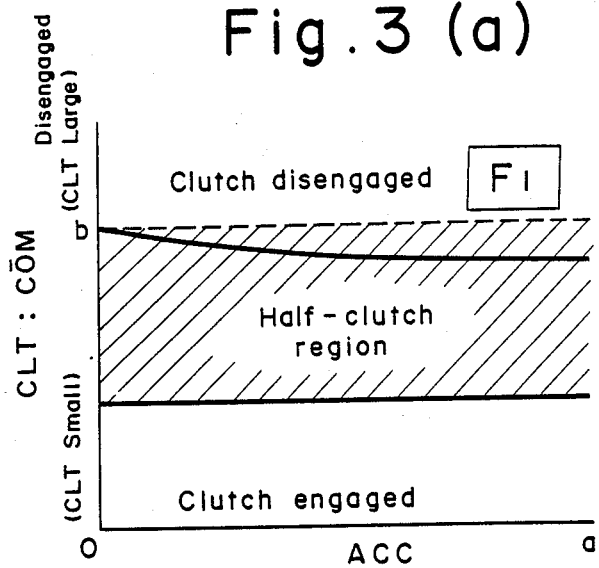
FIGS. 3(a) through 3(h) are graphs illustrating the control method indicated by the flowchart of FIG. 2.
Figure 3:
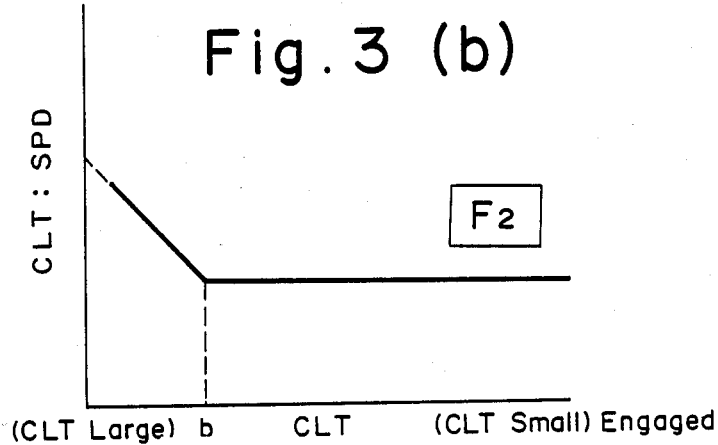
Figure 3:
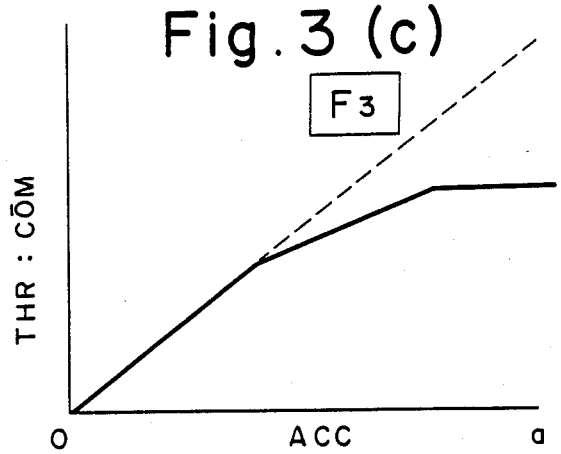
Figure 3:
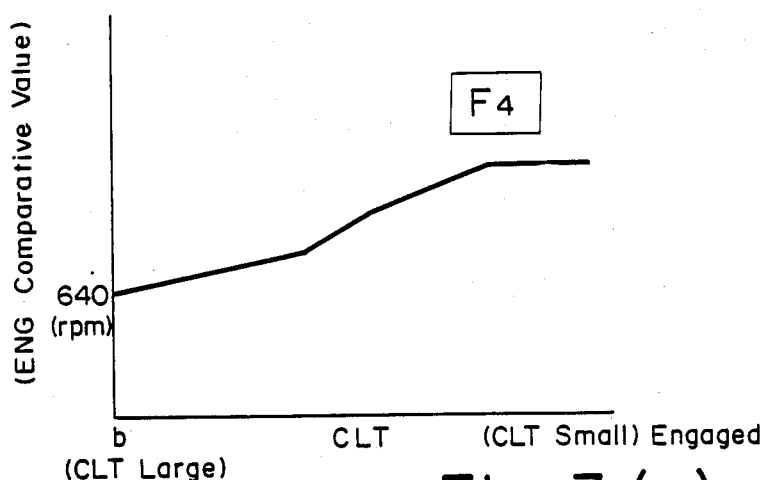
Figure 3:
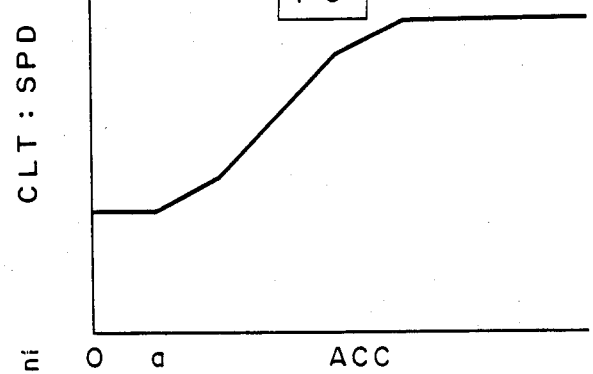
Figure 3:
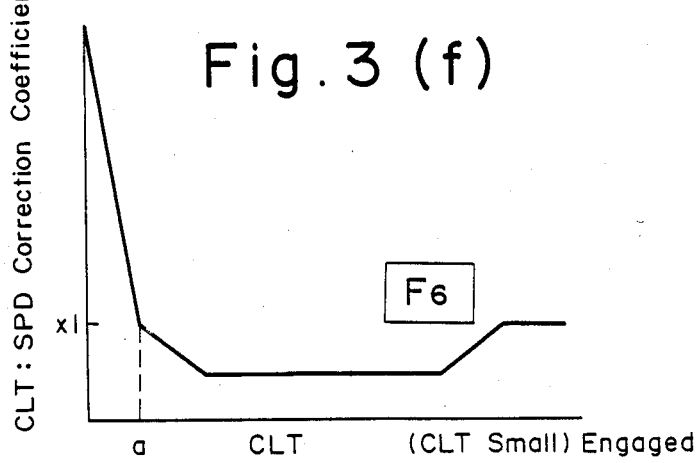
Figure 3:
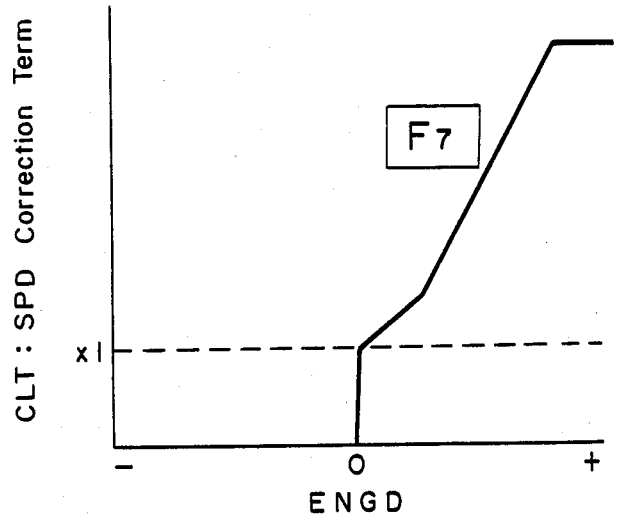
Figure 3:
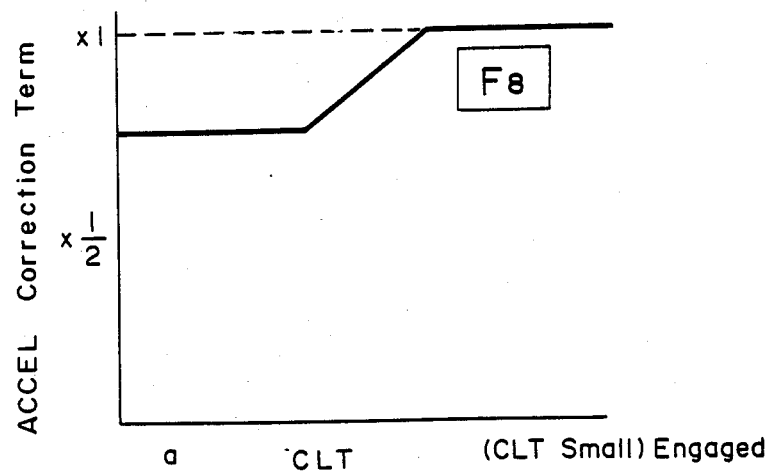

The control method of the present invention will now be described in detail in conjunction with the flowchart of FIG. 2 and the several graphs of FIG. 3 illustrating how control is performed.

In step 1 of the flowchart, the electronic control apparatus 10 reads in and stores an amount of clutch engagement CLT from the clutch position sensor 6a. In steps 2, 3 and 4, the electronic control apparatus 10 reads in engine rpm ENG from the engine rotation sensor 2a, stores ENG in memory, finds the change in engine rpm and stores the change ENGD in memory. Next, in a step 5, the control apparatus 10 reads in an amount of accelerator pedal depression ACC from the accelerator sensor 9a and stores ACC in memory. The electronic control apparatus 10 then performs a comparison (step 6) to determine whether or not ACC is zero. If ACC is not zero, the program moves to a step 7, in which the control apparatus 10 determines whether ACC is greater than a set value "a" for mode changeover. If the decision rendered here is that ACC is less than or equal to the set value "a", then the electronic control apparatus 10 executes a step 8, in which a clutch control target position CLT:COM is set to a half-clutch range on the basis of previously stored map data shown in FIG. 3(a). Next, in a step 9, the electronic control apparatus 10 varies the clutch operating speed CLT:SPD on the basis of previously stored map data shown in FIG. 3(b), with a position "B" at which the half-clutch region starts serving as a boundary. CLT:SPD is decided by the amount of clutch engagement. Then, until the set value "a" for mode changeover is reached, the electronic control apparatus 10 executes a step 10 to set a throttle target opening THR:COM, on the basis of previously stored map data shown in FIG. 3(c), so as to follow a curve corresponding to engine performance. Thus, control of the throttle opening is non-linear. The program then moves to a step 11, where the electronic control apparatus 10 performs a comparison operation to determine whether or not the amount of actual clutch engagement CLT, obtained from the clutch position sensor 6a, is less than the clutch control target position CLT:COM. If the result of the determination is affirmative, the program moves to a throttle control step. If CLT is greater than CLT:COM, then the clutch actuator 6 is operated at the clutch operating speed CLT:SPD. This is step 12 of the flowchart. This is followed by execution of a step 13, in which the electronic control apparatus 10 performs a comparison to determine whether the actual throttle opening THR is equal to the throttle target opening THR:COM. If it is not, the control apparatus 10 executes a step 14 in which the magnitude of the actual throttle opening THR is compared with that of the throttle target opening THR:COM. If the actual throttle opening THR is greater than the throttle target opening THR:COM, then the throttle actuator 3 is moved toward the closing side (step 15). If THR is smaller than THR:COM, the throttle actuator 3 is moved toward the opening side (step 16).

If the decision rendered in step 7 is that the amount of depression of the accelerator pedal 1 is greater than the set value "a" for mode changeover, the electronic control apparatus 10 compares, in a step 17, the engine rpm ENG with a comparative engine rpm value obtained based on an amount of clutch engagement from previously stored map data shown in FIG. 3(d). If the engine rpm ENG is greater than the comparative value, the electronic control apparatus 10 executes a step 18. Here, based on previously stored map data illustrated in FIG. 3(e), the control apparatus: finds a clutch operating speed CLT:SPD which exceeds the set value "a" for mode changeover owing to the amount of accelerator pedal 9 depression ACC; controls the engaging speed of the clutch actuator 6 in such a manner that the operating speed grows larger the greater the amount of accelerator pedal 9 depression becomes; finds, from previously stored map data shown in FIG. 3(f), a clutch operating speed correction coefficient F6 for the amount of clutch engagement CLT; finds, from previously stored map data shown in FIG. 3(g), a clutch operating speed CLT:SPD correction term for a change in engine rpm ENG; and multiplies these together to correct the clutch operating speed CLT:SPD. If the engine rpm ENG is less than the engine rpm comparative value in accordance with FIG. 3(d), then CLT=SPD is deemed to hold and the clutch is locked at the half-clutch position which prevails at that time (step 19). Next, in a step 20, the electronic control apparatus 10 finds an accelerator correction term for the amount of clutch engagement from the amount of accelerator pedal 9 depression ACC and previously stored map data shown in FIG. 3(h), thereby correcting the amount of actual accelerator pedal 9 depression ACC to decide the throttle target opening THR:COM. This is followed by execution of the step 11, in which the electronic control apparatus 10 performs a comparison to determine whether or not the amount of actual clutch engagement CLT is less than the clutch control target position CLT:COM, and by execution of steps 12 through 16. The value of the amount of clutch engagement CLT and of the clutch control target position CLT:COM are large on the disengaged side and small on the engaged side.

Thus, a comparison is performed to determine whether the amount of depression of accelerator pedal 9 is greater or less than the set value "a". If it is less, the clutch control target position CLT:COM is locked in the half-clutch range [FIG. 3(a)], the clutch operating speed CLT:SPD is decided by the amount of clutch engagement [FIG. 3(b)], and the target opening THR:COM of the throttle, rather than being controlled linearly with respect to the amount of depression of the accelerator pedal 9, is regulated in such a manner as to follow a curve corresponding to engine performance [FIG. 3(c)].

If the amount of accelerator depression is greater than the set value, on the other hand, the engine rpm ENG and the engine rpm comparatuve value [FIG. 3(d)] with respect to the amount of clutch engagement CLT are compared. If the engine rpm ENG is greater than the comparative value, then the engaging speed of the clutch actuator 6 is decided by the amount of accelerator pedal 9 depression ACC [FIG. 3(e)], the engaging speed of the clutch actuator 6 is corrected in accordance with the amount of clutch engagement [FIG. 3(f)], and the engaging speed of the clutch actuator 6 is corrected based on the change in engine rpm [FIG. 3(g)]. However, if the value of engine rpm is found to be less than the comparative value of engine rpm with respect to the amount of clutch engagement upon comparing the two, the engaging action of the clutch actuator 6 is halted. This is followed by deciding the throttle opening from the amount of depression of the accelerator pedal 1 and from the amount of clutch engagement [FIG. 3(h)].

Thus, the throttle is controlled independently of the amount of accelerator pedal depression until the clutch is fully engaged, and a changeover is effected between two control modes depending upon the amount of accelerator pedal depression. In other words, when the amount of accelerator pedal depression is less than a set value, a very low speed control mode is established in which the clutch control target position is locked in the half-clutch range, and in which the degree of half clutch and the throttle opening are decided based on the amount of accelerator pedal depression. When the amount of accelerator pedal depression is greater than the set value, however, an ordinary start mode is established in which the clutch is fully engaged, the clutch actuation speed is decided based on the amount of accelerator pedal depression, and the throttle opening is decided based on the amount of accelerator depression and on the amount of clutch engagement.

Figure 4:
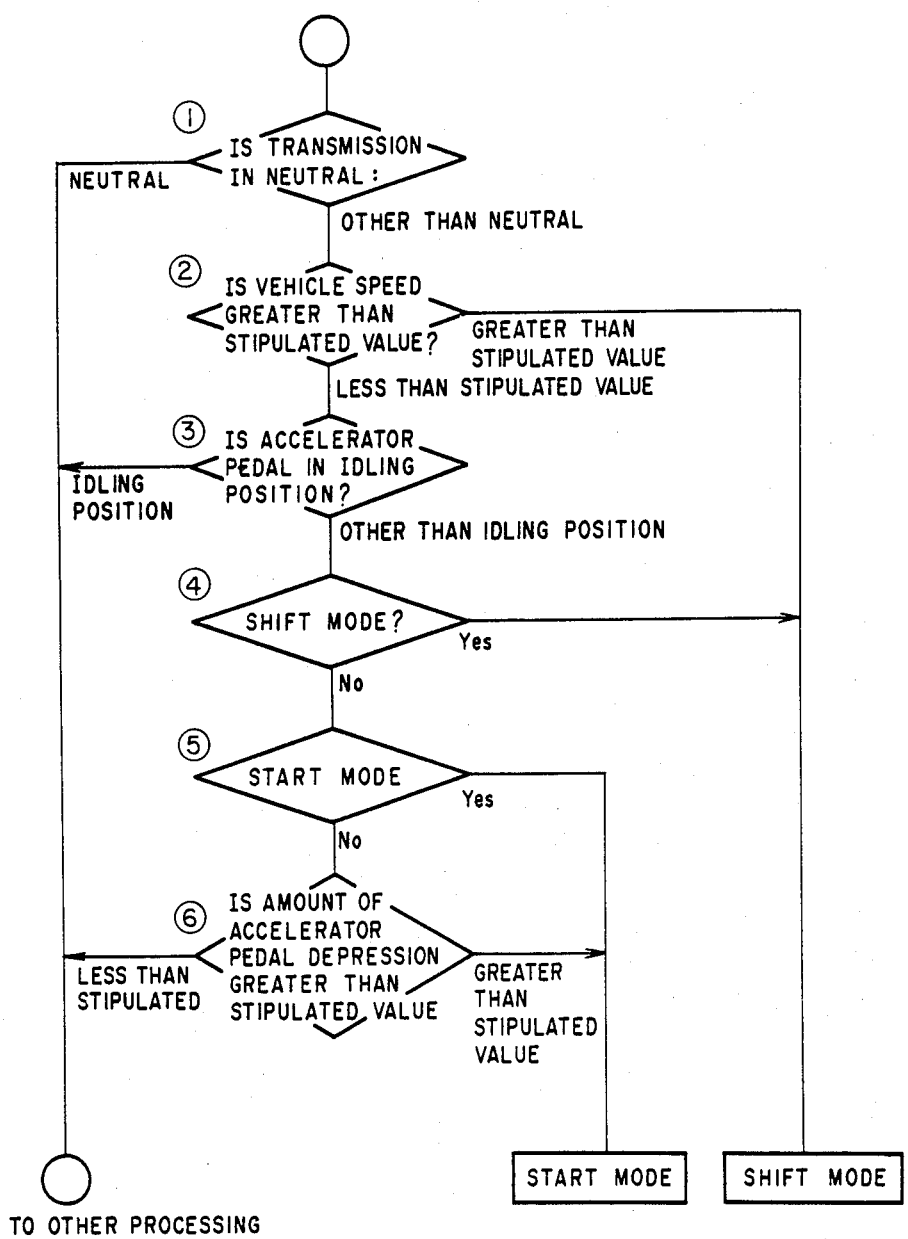
FIG. 4 is a flowchart illustrating how control is performed in accordance with a clutch control method according to an embodiment of the present invention.

Another method of clutch control according to the present invention will now be described with reference to FIG. 4.

According to the invention, vehicle speed is sensed. When the vehicle speed exceeds a prescribed value, a changeover is effected from a start mode to a shift mode to control the clutch in a different control mode. The control operation will now be described with reference to the flowchart of FIG. 4.

First, in a step 1, the electronic control apparatus 10 determines whether or not the gear position is the neutral position. If it is, the program shifts to another routine; if it is not, then the electronic control apparatus 10 executes a step 2 to determine whether or not the vehicle speed is greater than a set value. If it is, a shift mode is established in which an automatic clutch is subjected to control. If the vehicle speed is less than the set value, the electronic control apparatus executes a step 3 in which it is determined whether or not the accelerator pedal is in an idling position. If it is, the program moves to another routine. If the pedal is in a position other than the idling position, then the electronic control apparatus 10 executes a step 4. Here it is determined whether or not the shift mode prevails, namely whether or not the clutch is being engaged in the shift mode. If the decision is affirmative, the automatic clutch is controlled in the gear change mode; if negative, the program moves to a step 5. Here the electronic control apparatus 10 determines whether the start mode prevails. If the answer is YES, the automatic clutch is controlled in the start mode. A NO answer causes the program to move to a step 6, in which the electronic control apparatus 10 determines whether or not the amount of accelerator pedal depression is greater than a stipulated value. If it is, the start mode is established and the automatic clutch is controlled; if it is not, the program moves to another routine.

The present control method establishes a start mode and a shift mode by changing over the automatic clutch control mode in the manner described above. In each mode, the clutch can be controlled in a manner which will now be described.

First, in the start mode, the clutch engaging speed is controlled in accordance with the ordinary start mode of the above-described embodiment based on the amount of accelerator depression, the present clutch position and the change in engine rpm. However, if the engine rpm is low with respect to a value decided by the clutch position, clutch action is stopped. The relation deciding clutch speed (CLT:SPD) is expressed as follows:

CLT:SPD←

(1) 0 [providing that the condition ENG<$f_1$ (CLT) holds]

(2) $f_2$ (ACC)×$f_8$ (CLT)×$f_4$ (ENG) [providing that the condition ENG≧$f_1$ (CLT) holds]

In the foregoing, ENG, CLT, ACC represent engine rpm, clutch position and amount of accelerator pedal depression, respectively, and $f_1$ (CLT) represents a function in which clutch position serves as a parameter. Similarly, $f_2$ ( ), $f_8$ ( ) and $f_4$ ( ) represent functions in which the items enclosed by the parentheses serve as parameters. Accordingly, when engine rpm becomes larger than the function $f_1$ in which clutch position is a parameter, the clutch speed is changed depending upon engine rpm and the amount of accelerator pedal depression, or the cutch speed is regulated depending upon the start of clutch engagement or a clutch position such as one close to full clutch engagement, whereby the clutch speed can be controlled so as to achieve a smooth start from rest. Further, with the engine running at high rpm owing to depression of the accelerator pedal, the engine rpm will decline temporarily when the clutch is engaged, as is evident from the relation between $f_2$ and $f_4$. Owing to this temporary drop in engine rpm, clutch speed also declines and then rises as the engine rpm recovers, thereby making a smooth start possible.

Next, in the shift mode, clutch speed is controlled depending upon the amount of accelerator pedal depression, the gear in use and the clutch position. The relation deciding clutch speed (CLT:SPD) is expressed as follows:

CLT:SPD← g (ACC)×stroke speed (CLUTCH)

wherein g (ACC) is decided by the particular gear and represents a function in which the amount of accelerator pedal depression is a parameter. Accordingly, clutch speed is subjected to control depending upon the amount of accelerator pedal depression, thereby allowing rapid shifting of gears when the vehicle is travelling at high speed.

Another embodiment of the present invention will now be described.

FIG. 5 is a schematic view of an arrangement for practicing the present invention. FIG. 5 shows a vehicle engine, a clutch, a drive unit and a control apparatus therefor. An engine 2 includes fuel supply control means (not shown) and has a flywheel 20. The fuel supply control means comprises a throttle valve for controlling the amount of fuel and intake air in the case of a gasoline engine, or a control lever of a fuel injection pump in the case of a diesel engine. An actuator 3 (hereafter referred to as a throttle actuator) drives the throttle valve or the control lever of the fuel injection pump and is equipped with a throttle opening sensor 3a. A clutch 4 comprises a well-known friction clutch and has a clutch release lever 41.

A clutch actuator 6 comprises a cylinder 61, a piston 62 slidably disposed within the cylinder 61, and a piston rod 63 having one end thereof connected to the piston 62 and the other end thereof engaging the clutch release lever 41. The clutch actuator 6 has a clutch position sensor 6a for sensing the positions to which the piston 62 and piston rod 63 are moved, namely for sensing the amount of engagement of clutch 4.

A hydraulic mechanism 8 constitutes a source of fluid for such elements as the clutch actuator 6 and includes a hydraulic pump 8a disposed in a hydraulic circuit, a reserve tank 8b and an accumulator 8c. The hydraulic mechanism 8 is in communication with a hydraulic chamber 61a of the clutch actuator 6.

Numerals 7a and 7b denote supply and discharge solenoid valves, respectively, disposed in the hydraulic circuit. Opening the supply solenoid valve 7a supplies the hydraulic chamber 61 of the clutch actuator 6 with pressurized oil. Opening the discharge solenoid valve 7b discharges the pressurized oil from the hydraulic chamber 61a. It should be noted that the discharge solenoid valve 7b is adapted so as to be pulse controlled.

A drive unit 50, which includes a transmission and a terminal deceleration device, has an input shaft 51 connected to the clutch 4, as well as left and right drive wheels 52, 53. Provided within the drive unit 50 is a transmission actuator which is controlled hydraulically.

A gear position sensor 5a senses the gear position of the transmission in the drive unit 50. Numeral 51a denotes a rotation sensor for sensing the rotational speed of the input shaft 51. A vehicle speed sensor 53a senses the rotational speed of a drive shaft 52 or 53. An engine rotation sensor 2a senses the rotational speed of the flywheel 20 provided on the engine 2.

The electronic control apparatus 10 is constituted by a microcomputer and comprises: a processor 10a for executing processing; a read-only memory (ROM) 10b storing a control program for controlling the clutch 6, the transmission of the drive unit 50, and the throttle actuator 3; an output port 10c; an input port 10d; a random-access memory (RAM) 10e for storing the results of processing; and an address data bus (BUS) 10f for interconnecting the foregoing components.

As is apparent from FIG. 5, the output port 10c delivers control signal SVC to the throttle actuator 3 for controlling the opening of the throttle acutator 3. The occurrence of the opening of the throttle actuator 3 is transmitted to the electronic control apparatus 10 by signal ERS from the throttle sensor 3a to the input port 10d of the electronic control apparatus 10. The input port 10d is connected to, and receives output signals from, the clutch position sensor 6a, the rotation sensor 51a, the vehicle speed sensor 53a, the engine rotation sensor 2a, the accelerator pedal sensor 9a (potentiometer) for sensing the amount by which the accelerator pedal 9 is operated, and a brake pedal sensor 11a (potentiometer) for sensing the amount (via signal BP) by which a brake pedal 11 is operated.

In operation, the transmission is controlled in the following manner. An output signal (detection pulse) SPS from the vehicle speed sensor 53a is periodically applied to the processor 10a via the input port 10d. The processor 10a responds by calculating the vehicle speed SPD and storing the calculated value in the RAM 10e. A signal indicative of an amount of accelerator depression ACC from the accelerator pedal sensor 9a is applied to the processor 10a via the input port 10d and is stored in the RAM 10e. The processor 10a obtains the gear position from a shift map stored as a portion of the program in the ROM 10b and corresponding to the vehicle speed SPD and the amount of accelerator pedal depression ACC, and applies a shift control signal TCS for the transmission to the transmission actuator via the output port 10c, whereby the transmission actuator is controlled. The transmission actuator is connected to the hydraulic mechanism 8 so that an internally located select-and-shift actuator is hydraulically controlled to actuate the transmission and synchronously engage the desired gear. During actuation of the transmission, clutch control is performed as described below to execute automatic shifting.

Figure 8:
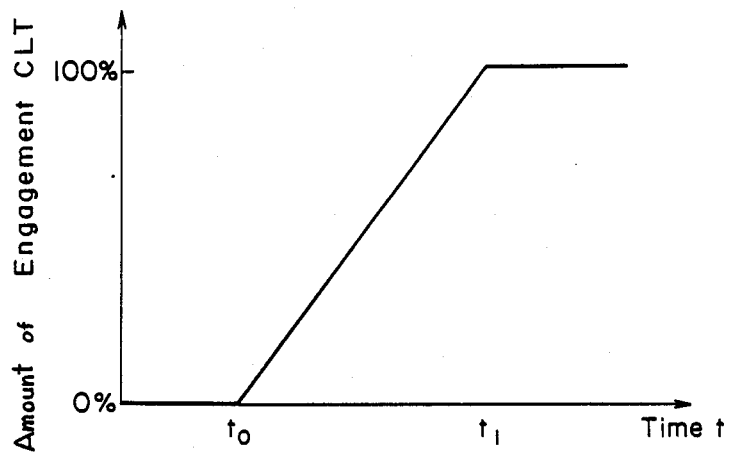
FIG. 8 is a graph illustrating the amount of engagement of a clutch.

The clutch 4 is controlled when shifting, and when the vehicle is started and stopped. When shifting, the clutch 4 is disengaged prior to the shift. More specifically, the processor 10a delivers a clutch disengage signal CLC to the supply solenoid valve 7a via the output port 10c to open the valve 7a. This causes the hydraulic chamber 61a of the clutch actuator 6 to be supplied with pressurized oil, whereby the piston 62 and piston rod 63 are moved to the left in FIG. 5. The piston rod 63 rotates the release lever 41 counter-clockwise about a support shaft 41a to disengage the clutch 4. Next, at the conclusion of the shifting operation, the processor 10a delivers a clutch disengage signal CLS to the discharge solenoid valve 7b through the output port 10c to open the valve 7b. In consequence, the pressurized oil is released from the hydraulic chamber 61a of the clutch actuator 6, and the piston rod 63 is gradually moved rightward to rotate the release lever 41 in the clockwise direction about the support shaft 41a. The clutch 4 therefore makes a transition from the disengaged to the engaged state via the half-clutch state, as shown in FIG. 8. Since the amount of engagement CLT of the clutch 4 at this time corresponds to the position of the piston rod 63, the output signal CLTS of the clutch position sensor 6a, which senses the position of the piston rod 63, has a magnitude corresponding to the amount of engagement CLT. Accordingly, the processor 10a is informed of the amount of engagement CLT of the clutch 4 by virtue of receiving the signal CLTS via the input port 10d, and stores the value of CLT in the RAM 10e. The clutch 4 is also disengaged when the vehicle speed drops below a prescribed value. That is, when the vehicle speed SPD, which is determined from the signal SPS produced by the vehicle speed sensor 53a, drops below a predetermined value, the processor 10a issues the clutch disengage signal CLC.

Figure 6:
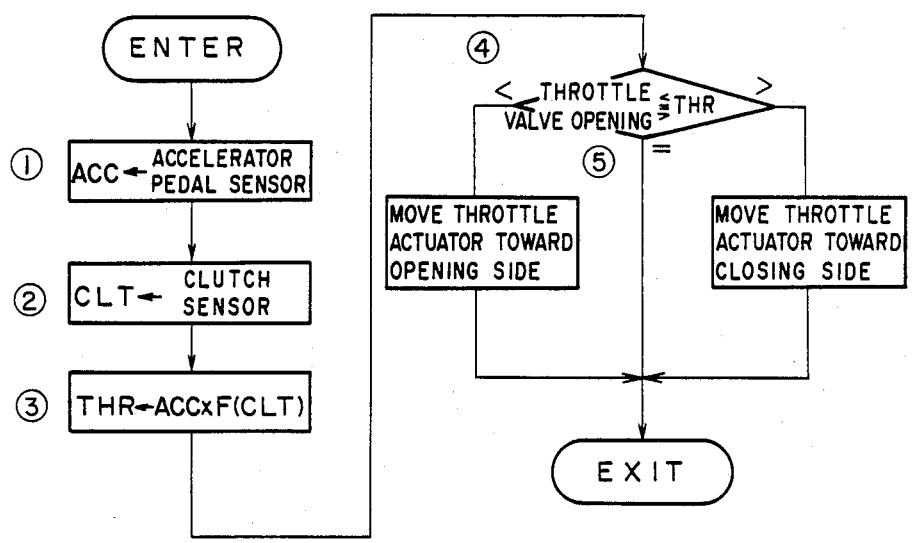
FIG. 6 is a flowchart illustrating how control is performed in accordance with a fuel supply control method according to the present invention.

If the accelerator pedal 9 is depressed with the clutch in the disengaged state when the vehicle is started or travelling at low speed, the electronic control apparatus 10 performs a control operation to engage the clutch. The electronic control apparatus 10 performs control by issuing the clutch engage signal CLS on the basis of a signal from the accelerator pedal sensor 9a indicating that the accelerator pedal 9 is starting to be depressed, or by controlling the opening of the throttle valve further. This will now be described with reference to the flowchart of FIG. 6.

The processor 10a of the electronic control apparatus 10 periodically reads the amount of depression ACC of the accelerator pedal 9 from the accelerator pedal sensor 9a via the input port 10d and stores the value of ACC in the RAM 10c (step 1). Next, in a step 2, the processor 10a reads the amount of engagement CLT of the clutch 4 from the clutch position sensor 6a via the input port 10d and stores the value of CLT in the RAM 10e. Then, in a step 3, the processor 10a, on the basis of these detection signals, calculates a throttle valve opening signal THR, namely a fuel supply signal, in accordance with the following equation:

$$THR = ACC \times CLT/100$$

wherein CLT ranges from 0 to 100.

Next, the processor 10a executes a step 4 for sensing the present throttle valve opening, namely fuel supply quantity, from the throttle opening sensor 3a via the input port 10d, and for comparing the value of the sensed throttle valve opening with the signal THR indicative of the calculated valve opening. In a step 5, the processor 10a delivers a drive signal SVC to the throttle actuator 3 via the output port 10c. The drive signal SVC moves the throttle actuator 3 toward the closing side if the throttle opening is greater than the signal THR, and toward the opening side if the throttle opening is less than the signal THR. If the throttle opening and the signal THR have identical values, then the processor 10a leaves the throttle actuator 3 as is. Thus, the throttle valve is caused to act in either the opening or closing direction to control the engine rpm accordingly.

The above-described calculation is not performed when the clutch is in the engaged or disengaged state. Rather, the clutch is actuated when a request for moving the clutch from the disengaged to the engaged state is produced by the accelerator pedal 9 or by a drive position selection operation performed by a select lever, which is not shown. Thus, the amount of accelerator pedal depression serves directly as a throttle valve opening signal without there being any need to perform the foregoing calculation when the clutch is in the engaged or disengaged state. The result is quicker response. Of course, the calculation can be performed when the clutch is in the engaged or disengaged state, if this is preferred.

Figure 7:
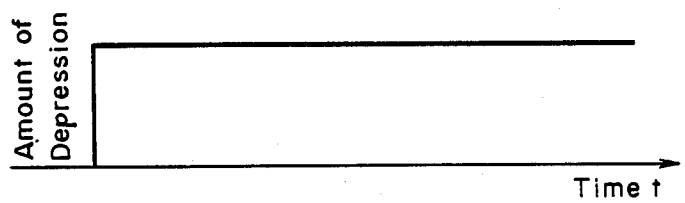
FIGS. 7(a) through 7(c) are graphs illustrating the control method indicated by the flowchart of FIG. 6.
Figure 7:
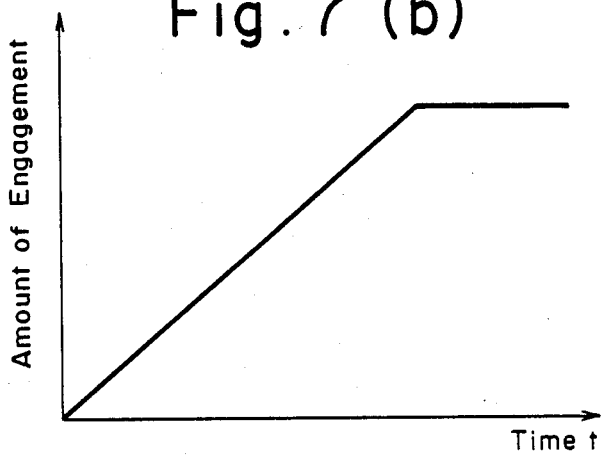
Figure 7:
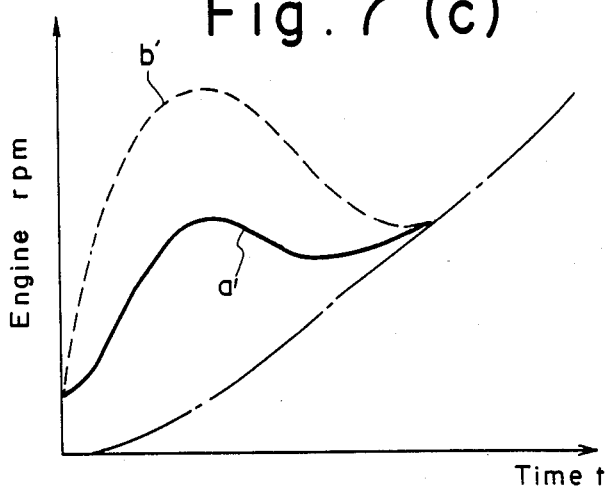

Throttle control executed in the manner described above will gradually raise the engine rpm. That is, if the amount of depression of the accelerator pedal 9 changes as shown in FIG. 7(a) and the amount of clutch engagement changes as shown in FIG. 7(b), then, according to the present invention, engine rpm will rise gradually as shown by the curve a' in FIG. 7(c) to eliminate the problem of engine racing that occurs with the prior-art method, which is indicated by curve b' in FIG. 7(c).

As many apparently widely different embodiments of the present invention can be made without departing from the spirit and scope thereof, it is to be understood that the invention is not limited to the specific embodiments thereof except as defined in the appended claims.

What we claim is:

1. A method of controlling the start of a vehicle equipped with an accelerator pedal sensor for sensing an amount of depression of an accelerator pedal, a throttle actuator for controlling an amount of fuel supplied to an engine, an engine rotation sensor for sensing rpm of the engine, a clutch actuator for controlling an amount of engagement of a clutch, a clutch position sensor for sensing the amount of engagement of the clutch, and an electronic control apparatus which receives detection signals from each of said sensors for controlling the throttle actuator and the clutch actuator based on the detection signals, said method comprising the steps of:
   (a) sensing the amount of depression of the accelerator pedal by the accelerator pedal sensor;
   (b) performing a comparison to determine whether the amount of accelerator pedal depression is greater than or less than a set value;
   (c) selecting a very low speed control mode as a start control mode, when the amount of accelerator pedal depression sensed is less than said set value, wherein the clutch is controlled in half-clutch range; and
   (d) selecting an ordinary start mode as a start control mode, when the amount of accelerator pedal depression sensed is greater than the set value, during which the clutch is controlled until fully engaged.

2. The method according to claim 1, wherein, when the start control mode is the very low speed control mode, the amount of clutch engagement is determined based on the amount of accelerator pedal depression.

3. The method according to claim 1, wherein, when the start control mode is the very low speed control mode, an engagement operating speed of the clutch actuator is determined by the amount of clutch engagement.

4. The method according to claim 1, wherein, when the start control mode is the ordinary start mode, an engagement operating speed of the clutch actuator is determined by the amount of accelerator pedal depression and corrected by the amount of clutch engagement and a change in engine rpm.

5. The method according to claim, 1, wherein, during the ordinary start control mode, engine rpm is compared with a comparative value of engine rpm obtained by calculation from the amount of clutch engagement, and an engaging operation of the clutch actuator is halted when the engine rpm is less than the comparative value of engine rpm.

6. A method of controlling a clutch in a vehicle equipped with an accelerator pedal sensor for sensing an amount of depression of an accelerator pedal, a clutch actuator for controlling an amount of engagement of a clutch, a clutch position sensor for sensing the amount of engagement of the clutch, an engine rotation sensor for sensing rpm of the engine, a vehicle speed sensor for sensing travelling speed of the vehicle, a gear position sensor for sensing a gear position of a transmission, as an electronic control apparatus which receives detection signals from each of said sensors for controlling the clutch actuator based on the detection signals, said method comprising the steps of:
   (a) sensing the travelling speed of the vehicle by said vehicle speed sensor;
   (b) performing a comparison to determine whether the travelling speed is greater than or less than a set value;
   (c) selecting a start control mode as a clutch control mode, when the travelling speed of the vehicle is less than the set value,
   wherein an engagement operating speed of the clutch actuator is determined based on the amount of accelerator pedal depression;
   (d) selecting a shift mode as a clutch control mode, when the travelling speed of the vehicle is greater than the set value,
   wherein an engagement operating speed of the clutch is determined based on the amount of accelerator pedal depression and a gear position.

7. The method according to claim 6, wherein, when the shift mode is in effect, clutch control is performed in the shift mode, even if the travelling speed of the vehicle is less than the set value.

8. A method of controlling supply of fuel to an engine in a vehicle, while a clutch of the vehicle is in the process of being fully engaged from its disengaged position, equipped with an accelerator pedal sensor for sensing an amount of depression of an accelerator pedal, a throttle actuator for controlling an amount of fuel supplied to an engine, a throttle sensor for sensing the amount of fuel supplied, a clutch actuator for controlling an amount of engagement of a clutch, a clutch position sensor for sensing the amount of engagement of the clutch, and an electronic control apparatus which receives detection signals from each of said sensors for controlling the throttle actuator and the clutch actuator based on the detection signals, said method comprising the steps of:
   (a) sensing the amount of depression of the accelerator pedal and the amount of engagement of the clutch;
   (b) calculating the amount of fuel desired to be supplied from the amount of accelerator pedal depression which is corrected by the amount of clutch engagement;
   (c) sensing an amount of fuel actually being supplied;
   (d) comparing said amount of fuel actually being supplied with the amount of fuel supplied calculated in step (b); and
   (e) controlling the throttle actuator in accordance with the result of the comparison in step (d).

* * * * *

UNITED STATES PATENT AND TRADEMARK OFFICE
CERTIFICATE OF CORRECTION

PATENT NO.  : 4,618,043
DATED       : Oct. 21, 1986
INVENTOR(S) : Hattori et al.

It is certified that error appears in the above-identified patent and that said Letters Patent is hereby corrected as shown below:

Col. 5
Line 5, delete "CLT:CŌM" and insert --CLT:C$\overline{OM}$--.
Line 10, delete "B" and insert --b--.

Col. 10
Line 36, delete "10c" and insert --10e--.

Signed and Sealed this

Twenty-seventh Day of January, 1987

Attest:

DONALD J. QUIGG

*Attesting Officer*        *Commissioner of Patents and Trademarks*